United States Patent [19]
Bucho

[11] Patent Number: 5,833,254
[45] Date of Patent: Nov. 10, 1998

[54] MUD FLAP ADAPTER ASSEMBLY

[76] Inventor: James Bucho, 125 Astle, Green River, Wyo. 82935

[21] Appl. No.: 598,516

[22] Filed: Feb. 8, 1996

[51] Int. Cl.⁶ ......................................................... B62B 9/16
[52] U.S. Cl. ............................................ 280/154; 280/851
[58] Field of Search ..................................... 280/848, 851, 280/154, 157, 495, 511; 248/214, 223.41

[56] References Cited

U.S. PATENT DOCUMENTS

| | | | |
|---|---|---|---|
| 2,935,336 | 5/1960 | Case | 280/851 |
| 3,549,171 | 12/1970 | Katz | 280/851 |
| 3,877,722 | 4/1975 | Conner | 280/851 X |
| 3,934,901 | 1/1976 | Hammerly | 280/851 |
| 4,033,599 | 7/1977 | Fusco | 280/851 |
| 4,165,092 | 8/1979 | Herlein | 280/851 |
| 4,326,727 | 4/1982 | Rock | 280/851 |
| 4,354,690 | 10/1982 | Hanson | 280/851 |
| 4,359,232 | 11/1982 | Maccari, Sr. | 280/851 |
| 4,627,594 | 12/1986 | Reed | 280/851 X |
| 4,740,003 | 4/1988 | Antekeier | 280/848 |
| 5,121,944 | 6/1992 | Haddox | 280/848 |

Primary Examiner—Brian L. Johnson
Assistant Examiner—Michael Mar
Attorney, Agent, or Firm—John E. Reilly

[57] ABSTRACT

A mud flap adapter is provided for use behind the rear wheels of a truck having a hitch receiver with an elongated sleeve extending along the rear of the truck. In the preferred embodiment, the adapter comprises a channel with hooked lower end between which the upper end of the mud flap is disposed. At the end of the channel opposite to the mud flap, the channel is secured to the hitch receiver sleeve via a J-bolt tightened against a flange mounted on the end of the hitch receiver sleeve when the adapter is in a telescoping relationship with the hitch receiver sleeve. A second embodiment of the present invention contemplates use of the adapter with a hitch receiver sleeve having closed ends. The sleeve end and the channel end are each equipped with cooperating flanges so that when the channel end of the sleeve end are abutted, the respective flanges are firmly but releasably secured to one another, thus also securing the mud flap adapter to the hitch receiver.

11 Claims, 2 Drawing Sheets

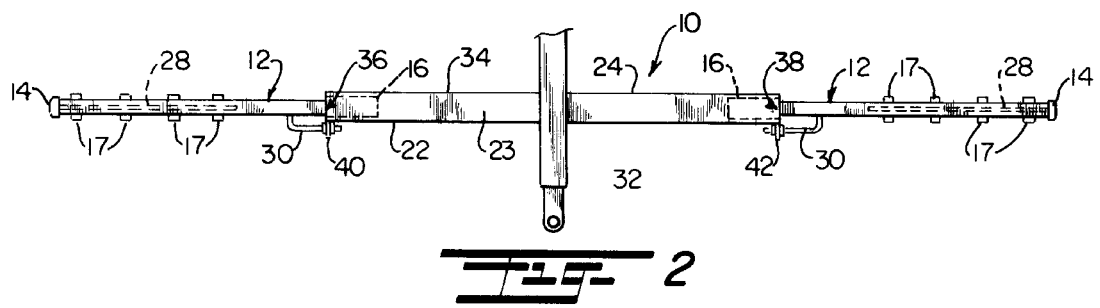
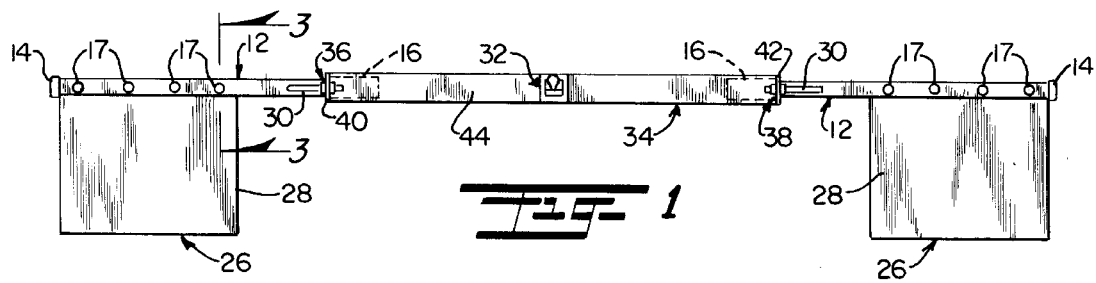
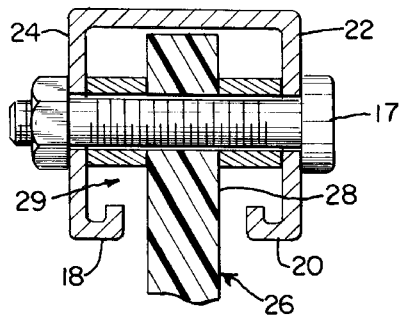
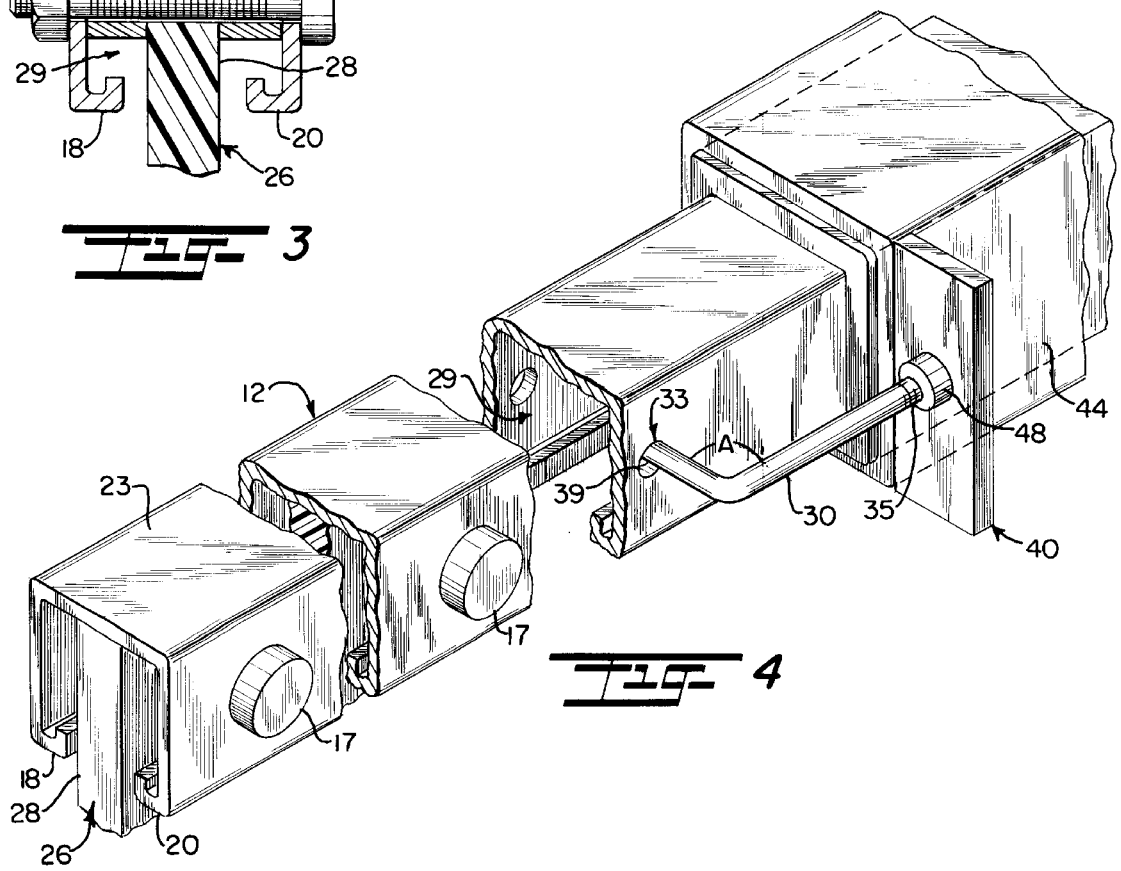

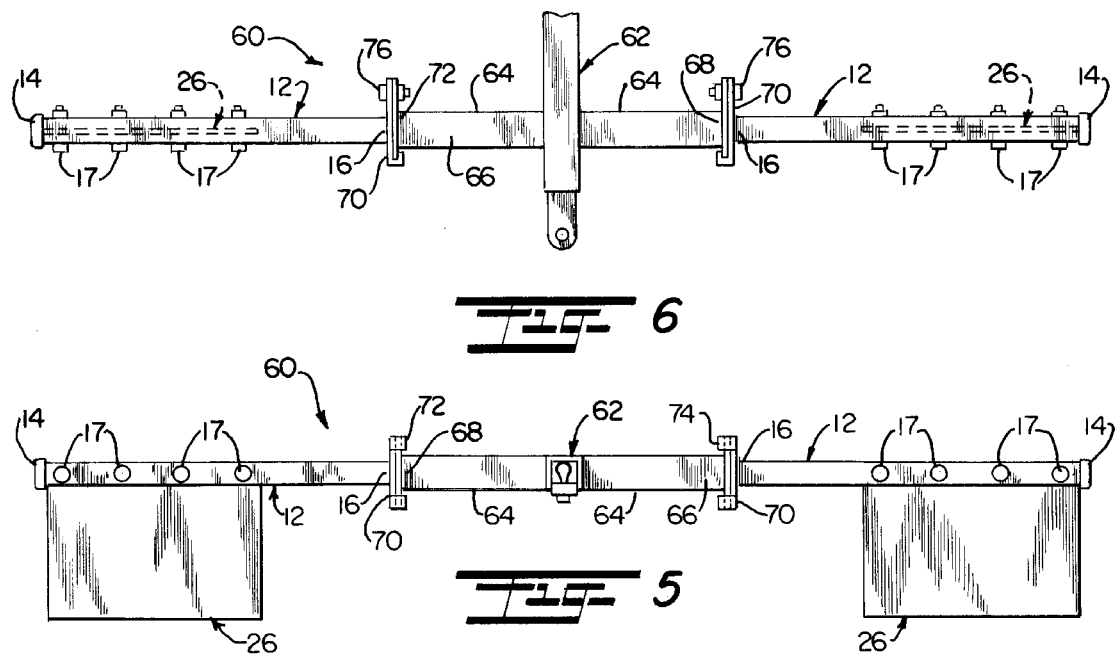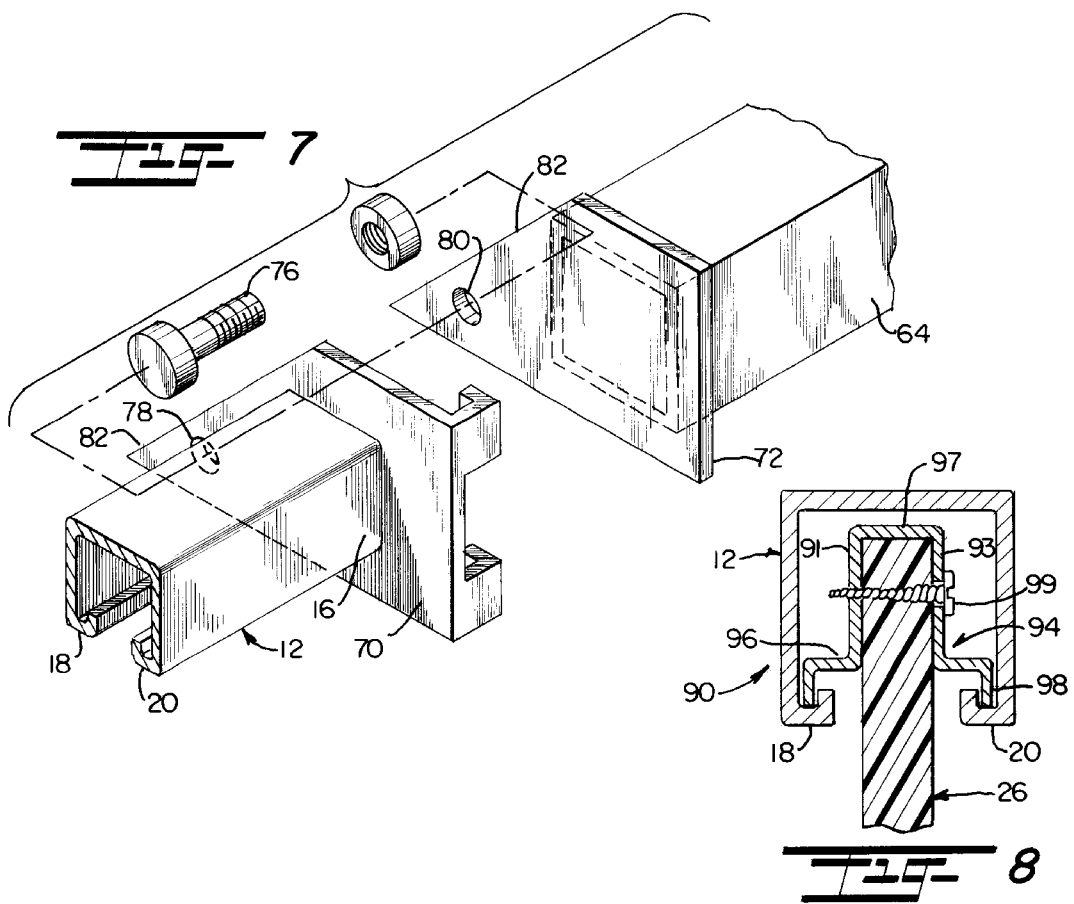

MUD FLAP ADAPTER ASSEMBLY

BACKGROUND AND FIELD OF INVENTION

The present invention relates generally to mud flaps used behind the rear wheels of a truck; and specifically relates to a mud flap adapter assembly intended for attachment to a hitch receiver mounted on the back of a truck.

Drivers of all sizes of trucks, from semi-tractor trailers to pickup trucks, use mud flaps behind their rear wheels to deflect flying debris propelled by their tires and to prevent the debris from striking other automobiles. Indeed, mud flaps are required by law in certain States, for instance, when a semi-tractor trailer is not pulling a load behind its cab.

Prior art inventors have attempted to address the problems of equipping trucks with mud flaps when that capability was originally not included by devising attachments or adapters that can be secured to the frame, rear bumper, or hitch receiver of a truck.

For example, U.S. Pat. No. 5,121,944 to Haddox shows an assembly for adjustable mounting of mud flaps which uses the transverse bar of a trailer hitch assembly and allows for variation in the radial disposition of the mud flap relative to the vehicle.

U.S. Pat. No. 4,033,599 to Fusco shows a foldable mud flap assembly that allows the flaps to be retracted between the wheels when not needed to avoid damage by use of an elongated extension member pivotally connected to a support member. The Fusco assembly employs channels and tubes in a telescoping relationship but uses a latch mechanism to connect them.

Conner, in U.S. Pat. No. 3,877,722, discloses a tube extending transversely along the back of a truck, each end of which receives a channel-supporting mud flap. The channels and tubes are held in place by means of a vertical pin inserted through aligned openings in the upper and lower faces of the channels and tubes, respectively. However, Conner's use of the vertically engaged pin suggests that the channel and tubes are not firmly attached, in that the pin cannot be firmly tightened and secured against any structure and thus might be dislodged from place by bumpy terrain.

U.S. Patents' to Herlain, Hammerly, Hanson, and Ancekeier U.S. Pat. Nos. 4,165,092, 3,934,901, 4,354,690 and 4,740,003, respectively, show mud flap and quarter fender mounting assemblies for attachment directly to the frame of a vehicle, rather than to a hitch receiver mounted on the rear of a truck.

None of the above prior art, however, discloses a mud flap adapter for use with a hitch receiver that includes hooked lower ends in a channel portion which serve to suspend the flaps more securely from the channel ends, especially when used in combination with a plurality of bolts, as the present invention provides. The mud flaps shown in the majority of the prior art are most often bolted directly to a crossbar or other sleeve at their upper ends which can account for increased wear and tear on those upper ends and do not adequately support the weight of the mud flap particularly when subjected to constant vibration and bouncing in traversing bumpy roads or at high speed travel.

Further, the attachment means for securing mud flaps to a crossbar disclosed in the above patents fail to show the combination of a J-bolt tightened against a flange, or the use of cooperating, interfitting flanges when a channel and sleeve are in an abutted relationship, both of which provide added stability and more secure attachment of the mud flap adapter to the hitch receiver.

SUMMARY OF THE INVENTION

It is therefore an object of the present invention to provide a mud flap adapter for use with a hitch receiver crossbar or transverse sleeve.

Another object of the present invention is to provide a mud flap adapter that more firmly and stably suspends the flaps from a bar or channel thereby providing increased longevity to the upper end of a mud flap.

It is yet a further object of the present invention to provide a mud flap adapter that employs a J-bolt and flange combination to more securely and firmly mount the adapter to the hitch receiver sleeve.

A further object of the present invention is to provide a mud flap adapter that attaches to a hitch receiver sleeve by joinder of interfitting, cooperating flanges mounted on abutting ends of the hitch receiver sleeve and adapter channel, respectively, wherein securing the flanges together firmly mounts the adapter to each end of the hitch receiver sleeve.

In accordance with the present invention, a mud flap adapter assembly is contemplated for use behind the rear wheels of a truck having a hitch receiver with an elongated sleeve extending along the rear of a truck, so that a pair of mud flap adapters may be releasably but positively secured to opposite ends of the hitch receiver sleeve. In the preferred embodiment, each mud flap adapter comprises an elongated channel with hooked lower ends between which the upper end of a mud flap is received. The hooked ends provide a loose clamping action around the upper end of the mud flap, thereby more firmly securing the mud flap to the adapter when used in combination with another attachment means, such as, a plurality of bolts. At an end opposite to the mud flap end, the channel includes a J-bolt disposed through an outer side of the channel, so that a portion of the J-bolt extends at a right angle to the channel side. The mud flap adapter is mounted to the hitch receiver sleeve by inserting the J-bolt end of the channel into the hitch receiver sleeve. The J-bolt is then received through a flange mounted on the end of the hitch receiver sleeve. Tightening of the J-bolt against the flange on the hitch receiver sleeve thus firmly but releasably secures the adapter to the sleeve.

In another embodiment of the present invention, each adapter is secured to one end of a hitch receiver sleeve having a closed end with a flange fixedly mounted thereon. One end of the adapter channel also includes a flange complimentarily sized to interfit the flange on the hitch receiver sleeve, the respective flanges are aligned and secured firmly in abutting relation to one another by attachment means inserted through aligned holes in each of the respective flanges. Tightening of the flanges against one another thus firmly secures the adapter to the sleeve.

In both embodiments described above, the mud flap may include a mounting bracket on its upper end, thereby allowing the mud flap to be slidably inserted into the channel ends, rather than mounting the upper end of the mud flap directly to the exterior, longitudinal sides of the channel. Once in place within the channel, the mounting bracket is retained in place by capping off the channel end with an end cap pressfit onto the channel end and secured thereto by a bolt.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a perspective view of the present invention showing a pair of mud flap adapters inserted into opposite ends of a hitch receiver sleeve and attached thereto by a cooperating J-bolt and flange assembly;

FIG. 2 is a top view of the preferred form of the present invention illustrating the mud flap adapter mounted to the hitch receiver sleeve with the J-bolt and flange assembly;

FIG. 3 is a cross-sectional view taken on line 3—3 of FIG. 1, illustrating the hooked lower ends of the adapter channel with the mud flap received and secured therebetween;

FIG. 4 is an exploded view of the preferred form of the present invention, partly in cross-section, illustrating the mud flap adapter channel secured to the hitch receiver sleeve with the J-bolt and flange assembly;

FIG. 5 is a perspective view of a second embodiment of the present invention, illustrating the mud flap adapter secured to a hitch receiver sleeve by means of cooperating, interfitting flanges;

FIG. 6 is a top view of the second embodiment of the present invention;

FIG. 7 is an assembly perspective view of the second embodiment of the present invention illustrating the pair of cooperating, interfitting flanges mounted on respective ends of the mud flap adapter channel and hitch receiver sleeve; and FIG. 8 is a cross-sectional view of a modified form of the mud flap, illustrating the mounting bracket on the mud flap's upper end retained within the channel.

DETAILED DESCRIPTION OF THE PREFERRED EMBODIMENT

Referring now in more detail to the drawings, FIGS. 1 through 4 illustrate the preferred form of the present invention, while FIGS. 5 and 7 show a second embodiment of the present invention which will be described in detail below.

For simplicity's sake, the mud flap adapter 10 of the present invention described herein will refer to one of the pair shown in FIGS. 1 and 2, the other adapter being an identical, mirror image of the one described. As shown in FIGS. 1 and 2, the preferred form of the mud flap adapter 10 of the present invention broadly comprises an elongated channel 12 having opposite longitudinal ends 14, 16, substantially parallel sides 22, 24, and lower hooked ends 18, 20. A mud flap 26 is received between the lower hooked ends 18, 20 proximate to one of the channel ends 14 and secured to the channel 12 via a plurality of bolts 17 through aligned bores in the upper end of the mud flap 26 and channel 12.

Proximate to the channel end 16, a J-bolt 30 is received through a hole 39 in the longitudinal sides 22 thereby forming a right angle relative to the longitudinal side 22 while extending toward the channel end 16.

The channel end 16 thus equipped with the J-bolt 30 is adapted for attachment to a hitch receiver 32, preferably one having an elongated tubular sleeve 34 extending transversely along the back of a truck. The sleeve 34 includes opposite longitudinal open ends 36, 38 each of a width that will allow the channel end 16 to be slidably inserted therein. Proximate to each of the sleeve ends 36, 38 is a J-bolt receiving flange 40, 42 fixedly mounted to an exterior side 44 of the sleeve 34. Once the channel end 16 is inserted into the sleeve 34 at either of its respective ends 36, 38, the J-bolt 30 is threaded through a bore 48 in the flange 40, 42. Tightening of the J-bolt 30 against the flange 40, 42 thus firmly attaches the mud flap adapter 10 to the hitch receiver sleeve 34, thereby suspending the mud flap 26 from the channel 12 on the truck end.

Turning next to a closer study of the mud flap adapter 10, as shown in FIGS. 1 and 2, the channel 12 is preferably an elongated, square-shaped tube, comprising a pair of substantially parallel sides 22, 24 joined by generally flat upper face 23. The channel's length may be varied according to the relative width of the rear end of the truck on which the adapter 10 is mounted. The channel sides 22, 24 terminate into slightly hooked lower ends, 18, 20, the space between which is roughly sized to accommodate the upper end of a mud flap 26 so that the uppermost portion of the mud flap is encompassed within a hollow region 29 in the channel 12, as best illustrated in FIG. 3. The channel sides 22, 24 and the upper end 28 of the mud flap 68 each include a plurality of holes that will align when the upper end of the mud flap 28 is engaged between the hooked lower ends 18, 20, thereby allowing a plurality of bolts 17 to be threaded through the aligned holes and then secured via tightening each bolt 17.

The positioning of the mud flap within the hollow area 29 allows the lower hooked ends 18, 20 to serve a loose clamping function to more firmly secures the mud flap 26 to the channel 12 when the bolts 17 are in place, and further, prevents undue swinging of the flap 26 about the channel 12 when the truck is in motion or the flap 26 is otherwise being blown about.

Opposite to the channel end 14 from which the mud flap 28 is suspended is the channel end 16 which is intended to be joined to a hitch receiver 32, preferably one of a type having a transverse, tubular square sleeve 34, with open ends 36, 38, extending along the back end of the truck. Each of the open sleeve ends 36, 38 accommodate an appropriately sized channel end 16 that is slidably inserted therein. That is, the channel 12 and sleeve 34 are thus in a telescoping relationship to one another, with the width of the sleeve 34 slightly larger than that of the channel 12. The hitch receiver sleeve 34 is similarly structured to the channel 12, having two substantially parallel longitudinal sides 44, 46 joined by two substantially parallel upper and lower faces 48, 50. However, unlike the channel 12, the sleeve 34 does not require the hooked lower ends 18, 20 used on the channel 12.

As noted above, channel end 16 is intended to be attached to the hitch receiver sleeve 34 in the manner now to be described. At a point on the channel side 24, which in FIGS. 1 and 2 would face outwardly from the back of a truck when the mud flap adapter 10 is in use with the truck, a J-bolt 30 is disposed proximate to the channel end 16. As the name implies, the J-bolt 30 resembles the letter "J" and has a hooked end 33 and an opposite straight end 35. As best shown in FIG. 4, the J-bolt is mounted into the channel side 24 such that the hooked end 33 is inserted through a hole 39 in the outwardly facing channel side 24. The hooked end 33 is thus contained within the channel's hollow region 29. The remainder of the J-bolt 30 extends outwardly from the exterior channel side 24, forming a right angle A, or an L-shape, relative to the channel side 24.

Proximate to each of the hitch receiver sleeve's open ends 36, 38, a J-bolt receiving flange 42, or wing, of a generally rectangular configuration is fixedly mounted on the exterior longitudinal side 44, extending therefrom at a right angle relative to the side 44. A hole 48 in the flange 42 is sized and placed to receive the straight end 35 of the J-bolt when the channel end 16 is slidably engaged into the open sleeve end 36. Once the J-bolt 30 and flange 42 are thus engaged, the J-bolt 30 is tightened against the flange 42, thereby firmly securing the mud flap adapter 10 to the truck's hitch receiver sleeve 34.

Both the channel 12 and the hitch receiver sleeve 34 preferably are constructed of steel or aluminum, or any similarly composed material. As noted above, the mud flap 26 is detachably suspended from the channel 12 between the hook's lower ends 18, 20 and secured firmly within the hollow region 29 via a plurality of bolts 17. The mud flap 26, as shown in FIGS. 1 and 2, is contemplated as being of the traditional type, that is, substantially rectangular in shape and mare of sturdy plastic or rubber. As best shown in FIG. 3, the upper end of the mud flap 26 is more firmly secured within the channel 12 by a bolt 17 threaded through aligned holes in both channel sides 22, 24 and the mud flap's upper end 28. While the hooked lower ends 18, 20 are not pictured as contacting the sides of the mud flap 26, it is also contemplated that the hooked lower ends 18, 20 may extend further towards the mud flap 26 than pictured, and, in fact, could lightly engage mud flap 26 in a loose clamping relation.

MODIFIED FORM OF THE PRESENT INVENTION

A second embodiment of the present invention is illustrated in FIGS. 5 through 7, wherein a mud flap adapter 60 is intended for use with a hitch receiver 62 having an elongated sleeve 64 with opposite closed ends 66, 68. As in the preferred form of the present invention, the mud flap adapter 60 comprises an elongated channel 12 having opposite longitudinal ends 14, 16, substantially parallel sides 22, 24 and lower hooked ends 18, 20. This second embodiment resembles the preferred form of the mud flap adapter 10 in that the mud flap 26 is received between the lower hooked ends 18, 20 proximate to the channel end 14 and secured to the channel 12 via a plurality of bolts 17 through aligned bores in the upper end of the mud flap 26 and channel 12, respectively.

As noted above, however, this second embodiment of the mud flap adapter 60 is securable to a hitch receiver sleeve 64 which has a closed end, rather than the open ends 36, 38, shown in FIGS. 1 through 4, which allowed for telescoping arrangement between the channel 12 and hitch receiver sleeve 34 in the preferred form. Proximate to the channel end 16, a flange bracket 70 is fixedly mounted. Likewise, flanges 72, 74 are mounted on hitch sleeve ends 66, 68. The flanges 72, 74 are complimentarily sized to interfit with the flange bracket 70 so that when the channel end 16 is abutted against the sleeve end 66, 68, the hitch receiver flange 72, 74 will snugly fit against the flange bracket 70.

As best shown in FIG. 7, each of the cooperating flanges 70, 72, 74 are preferably of a construction having an attachment lip 82 extending away from the sleeve 64 and channel 12 and with a bore 78, 80 through each attachment lip. When the channel end 16 and sleeve end 66, 68 are abutted and the flanges 70, 72, 74 interfitted, an attachment means 76 may be threaded through aligned bores 78, 80, thereby firmly but releasably securing the mud flap adapter 60 to the hitch receiver sleeve 64. As FIG. 7 shows, a suggested construction for the flange bracket 70 and flanges 72, 74 is a four-sided configuration having unequal sides, thus allowing securement of the attachment means 76 through the longer of the four sides. However, various other shaped flanges and brackets could be employed to accommodate varying sizes in hitch receiver sleeves and channels, as well as the distance between the mud flap adapter assembly and the rear of the truck.

In both embodiments of the present invention, a mud flap 90, as shown in FIG. 8, having an upper end 92 may include a mounting bracket 94 having a pair of substantially parallel sides 91, 93, terminating in L-shaped lower ends 96, 98, and an upper, generally U-shaped closed end portion 97 into which the mud flap's upper end 92 is received. Once inserted into the mounting bracket 94, the upper end 92 is secured thereto with a series of bolts or screws 99 received through aligned holes in the upper end 92 and bracket sides 91, 93. The mounting bracket 94 with the mud flap 90 secured thereto is then slidably received into an end of the channel portion 12 with the L-shaped, widened lower ends 96, 98 inserted into the lower hooked ends 18, 20 of the channel 12. The end of the channel 12 may then be capped with an end cap 14, as designated in FIGS. 5 and 6, to prevent the mounting bracket 96 from sliding out of the channel 12.

The principal advantage of the above-described embodiment is that it enables quick insertion and removal of the mud flap 90 into the channel 12 if use of the mud flaps is not desired when traveling in certain weather conditions, such as snow.

It is therefore to be understood that while preferred and modified forms of invention have been herein set forth and described, the above and other modifications may be made in the construction and arrangement of parts comprising the invention without departing from the spirit and scope thereof as defined by the appended claims and any reasonable equivalents.

I claim:

1. A mud flap adapter assembly for use behind the rear wheels of a truck having a hitch receiver with an elongated sleeve extending along the rear of said truck and having opposite longitudinal ends, said adapter assembly comprising:

a pair of mud flap adapters, each said adapter having an elongated channel having hooked lower ends disposed between a pair of substantially flat, parallel longitudinal sides and having opposite ends, one of said ends extending toward one of said hitch receiver ends;

a first flange fixedly mounted on one of said channel ends;

a second flange fixedly mounted on one of said ends of said hitch receiver sleeve, said first and second flanges of interfitting construction, so that when said channel end having said flange mounted thereon is abuttingly aligned with said end, said first and second flanges are abuttingly aligned and securable to one another by first attachment means, whereby tightening of said attachment means rigidly secures said adapter to said hitch receiver sleeve;

a mud flap disposed between said hooked lower ends of said channel whereby said mud flap is suspended from said channel; and wherein said mud flap includes a mounting bracket disposed at an upper end of said mud flap, said bracket comprising a pair of substantially parallel sides terminating in generally L-shaped lower ends and having a generally U-shaped closed end portion into which said mud flap upper end is received and secured thereto by second attachment means.

2. A mud flap adapter according to claim 1 wherein said mud flap includes an upper end and a lower end, said upper end disposed between said lower hooked ends and including a plurality of holes therethrough.

3. A mud flap adapter according to claim 1 wherein said first attachment means comprises a nut and bolt assembly.

4. A mud flap adapter according to claim 3 wherein said second attachment means is a plurality of nut and bolt assemblies.

5. A mud flap adapter according to claim 4 wherein said channel includes a plurality of bores in each of said parallel longitudinal sides at a point proximate to one of said ends, said channel bores and said mud flap holes correspondingly aligned when said mud flap is disposed between said hooked lower ends, thereby allowing said second attachment means to be inserted through said aligned bores and holes, thus firmly but releasably securing said mud flap adapter to said channel.

6. A mud flap adapter according to claim 5 wherein said first and second flanges each include a bore therethrough, said bores disposed in aligned relation to one another when said flanges are in said abutting relation to one another, thereby permitting said attachment means to be received through said aligned bores.

7. A mud flap adapter according to claim 1 wherein said mounting bracket is slidably received into one of said channel ends, said L-shaped bracket ends interfittingly engaged with a respective one of said channel hooked lower ends.

8. A mud flap adapter assembly for use behind the rear wheels of a truck having a hitch receiver with an elongated sleeve extending along the rear of said truck and having opposite longitudinal ends, said adapter assembly comprising:

a pair of mud flap adapters, each of said adapters having an elongated slot at one end disposed between a pair of substantially flat, parallel longitudinal sides and having an opposite end extending toward one of said hitch receiver ends;

a first flange mounted on each of said opposite ends;

a second flange fixedly mounted on each of said ends of said hitch receiver sleeve so that when said channel end having said first flange mounted thereon is abuttingly aligned with said sleeve end, said first and second flanges are abuttingly aligned and securable to one another by first attachment means in the form of a nut and bolt assembly and wherein tightening of said first attachment means rigidly secures said adapter to said hitch receiver sleeve; and a mud flap having a mounting bracket at its upper end slidably disposed in each said slot including suspension means for retaining said mounting bracket for downward suspension of said mud flap from each of said adapters wherein each said adapter has an elongated channel and said suspension means defined by laterally spaced hooked lower ends with said mounting bracket disposed therebetween, said hooked lower ends adapted to receive lower portions of said mounting bracket.

9. A mud flap adapter according to claim 8 wherein said channel includes a hollow region formed between longitudinal sides.

10. A mud flap adapter according to claim 8 wherein said mounting bracket comprises a pair of substantially parallel sides terminating in widened lower ends and having a generally U-shaped upper closed end portion in which said mud flap upper end is received and secured thereto by attachment means.

11. A mud flap adapter according to claim 10 wherein said mounting bracket is slidably received into one of said channel ends, said lower bracket ends interfittingly engaged with a respective one of said channel hooked lower ends.

* * * * *